Patented Nov. 3, 1953

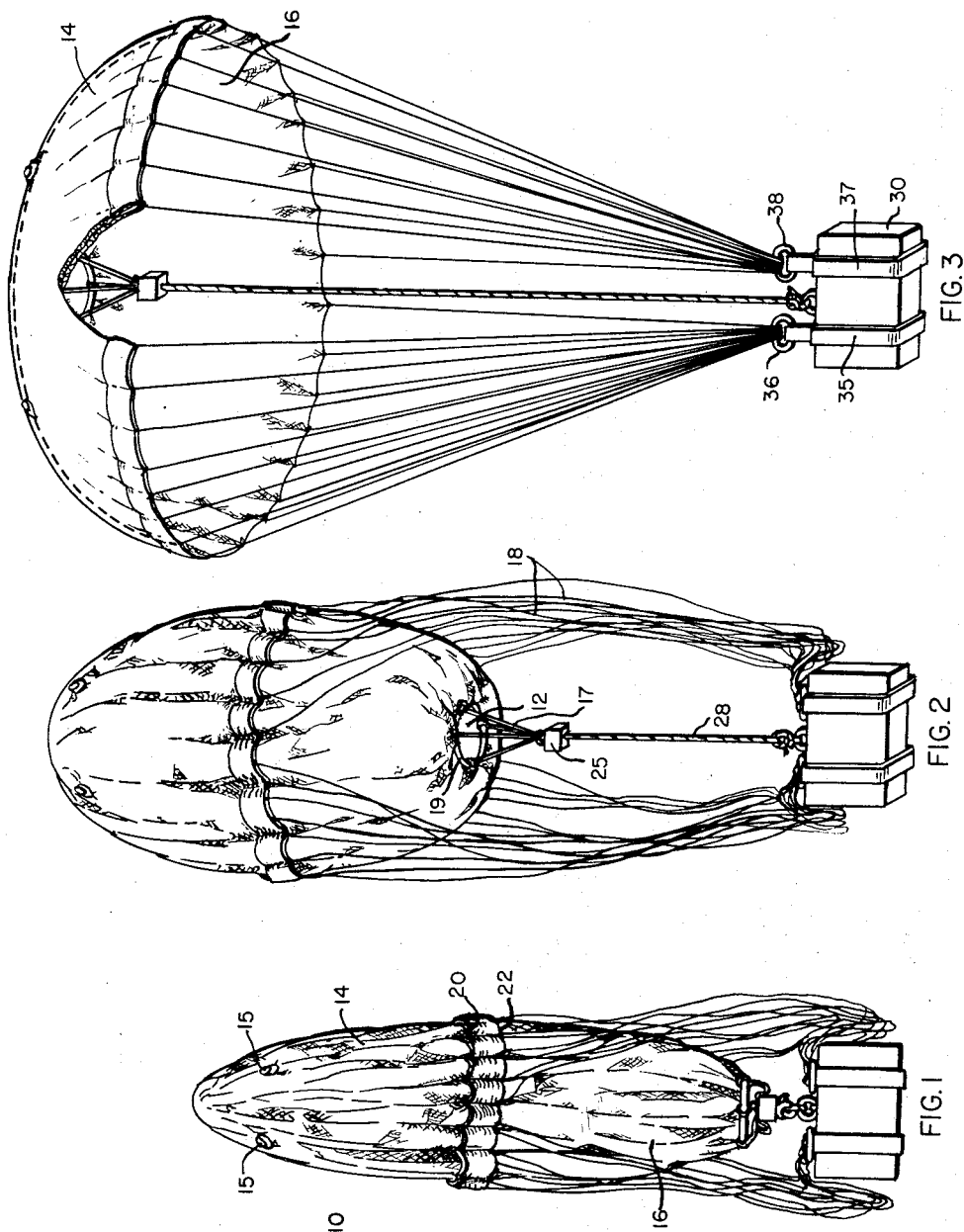

2,657,885

UNITED STATES PATENT OFFICE 2,657,885

SHOCK REDUCING PARACHUTE

James M. Brady, West Long Branch, N. J., assignor to the United States of America as represented by the Secretary of the Army Application December 3, 1951, Serial No. 259,685

5 Claims. (Cl. 244—145)

(Granted under Title 35, U. S. Code (1952), sec. 266)

The invention described herein may be manufactured and used by or for the Government for governmental purposes, without the payment of any royalty thereon.

This invention relates to a parachute and more particularly to a parachute having predetermined descent and shock reducing characteristics.

Parachutes presently known in the art have a relatively slow descent rate and, upon opening, transmit a relatively large and undesirable amount of shock to the load being borne thereby. Slow rates of descent may be dangerous especially when loads are being dropped near or within enemy range during times of armed conflict. Even though the rate of descent is relatively slow with presently known parachutes, opening shock is oftentimes excessive. Excessive shock is especially undesirable when fragile or delicate loads such as radios or other signal or medical corps equipment are being dropped to land troops. A parachute arrangement combining the features of swift descent with a minimum of opening shock is highly desirable.

It is an object of this invention to overcome the above and related disadvantages.

Another object of this invention is to provide a parachute having predetermined descent characteristics.

A further object of this invention is to provide a parachute arrangement having a fast rate of descent combined with a minimum of opening shock.

These and other objects of the invention will become apparent from the description and claims that follow.

In a preferred embodiment of this invention the parachute arrangement comprises an inflatable envelope that is initially collapsed, means initially responsive to the descent of said arrangement, and means responsive to said inflation for collapsing the envelope relative to a plane perpendicular to the direction of descent of the arrangement. The arrangement is such that the air resistance area of the envelope is progressively increased during descent whereby opening shock is reduced to a minimum.

The invention will be more clearly understood by reference to the appended drawings wherein:

Fig. 1 shows a parachute in accordance with an embodiment of this invention upon first release from an airborne craft, Fig. 2 shows the parachute of Fig. 1 a few moments after release, and Fig. 3 shows the parachute of Fig. 2 fully opened.

Like numerals refer to like parts throughout the drawings. The drawings are representative only and are not to an exact scale.

Referring to the drawings the parachute may be seen to consist of an arrangement comprising a generally balloon shaped inflatable envelope 10. This envelope may be divided, for the sake of description, into two sections 14 and 16. During descent 14 would be the upper section and 16 the lower section of envelope 10. About the midsection or meridian of envelope 10 are circumferential seams 20 and 22 which separate upper section 14 from lower section 16. One or two seams may be employed depending upon the material comprising envelope 10, type of load to be borne, etc. In most instances envelope 10 will be constructed from conventional parachute material, or a suitable rubber composition. Lower section 16 of envelope 10 has an opening 12 therein for receiving air during descent of the parachute arrangement. To provide release for excessive air pressure developed within envelope 10 during descent of the parachute arrangement, a plurality of vents are provided as shown by the numerals 15.

Conventional shroud lines 18 are attached securely at one end to envelope 10 along seam 22 as shown, and at the other end to rings 36 and 38 which are in turn respectively attached to brackets 35 and 37 which embrace load 30.

Lower section 16 of envelope 10 as previously described has an opening 12 therein. Opening 12 is defined by ring 19 to which an end of lower section 16 of envelope 10 is firmly secured. Attached to ring 19 are shroud lines 17 which are secured at one end to slow release device 25. Slow release device 25 is of conventional construction and controls the rate of release of load line 28 (which is secured at one end to load 30) therefrom. In general slow release device 25 may comprise a housing inclosing therein a spring loaded reel to which the other end of line 28 is attached. The function of slow release device 25 will be explained more completely hereinafter.

Briefly the parachute arrangement shown operates as follows:

Once the arrangement is released from the craft which bears it, air enters opening 12 in envelope 10. This air inflates envelope 10 as shown in Fig. 2. The rate of descent of the inflated envelope 10 is much slower than that of the collapsed envelope 10 shown in Fig. 1. Upon inflation of envelope 10, slow release device 25 is activated. Load line 28 begins to take up all of load 30 until the instant is reached at which time the load is taken up solely by shroud lines 18 and lower section 16 of envelope 10 folds within upper section 14 of said envelope to form a conventional parachute canopy as shown in Fig. 3. The opening of the parachute is so gradual that opening shock is reduced to a minimum.

Means of releasing the parachute arrangement of this invention from the craft within which it may be borne is optional. In its simplest mode the chute and cargo to be borne thereby may be maintained in the manner shown in Fig. 1, the upper section 14 of envelope 10 being held upright by hooking it to a line in the craft. Said chute may then be released by pushing the load secured to the chute from the craft and at the same time releasing the envelope 10 from the line. It is also feasible that the parachute may be packed and released in the same manner as a conventional parachute.

As many apparently widely different embodiments of the invention may be made without departing from the spirit and scope hereof, it is to be understood that the invention is not limited to its specific embodiment except as defined in the appended claims.

What is claimed is:

1. In a parachute for reducing opening shock upon the load connected thereto, a balloon shaped envelope having an upper and a lower half, a ring shaped opening in said lower half for receiving air therethrough as said parachute falls through space, a slow release device, a first set of shroud lines one end of which is connected about said opening and the other end of which is connected to said slow release device, a second set of shroud lines secured at one end about the midsection of said envelope and at the other end to said load, and a load line connected at one end to said load and fastened within said slow release device at the other end for release therefrom so that as said parachute falls through space said balloon is gradually inflated, said load line is slowly released from said slow release device and said lower half of said balloon gradually folds within said upper half of said balloon to form a canopy over said load as said load is slowly taken up by said second set of shroud lines.

2. In a parachute for reducing opening shock upon the load connected thereto, an inflatable envelope having an upper and a lower half, first means in said lower half for receiving air therethrough as said parachute falls through space, yieldable second means connected at one end to the bottom portion of said lower half and at the other end to said load for slowly releasing, when stressed, said load from said lower half and third means secured at one end about the midsection of said envelope and at the other end to said load so that as said parachute falls through space said balloon is gradually inflated and said lower half of said balloon is gradually released from said load and folds within said upper half of said balloon to form a canopy over said load.

3. In a parachute for reducing opening shock upon the load connected thereto, a balloon shaped envelope having a ring shaped opening at one end thereof for receiving air therethrough as said parachute falls through space, a slow release device, a first set of shroud lines one end of which is connected about said opening and the other end of which is connected to said slow release device, a reinforced circumferential band about the midsection of said balloon, a second set of shrouds one end of which is connected to said reinforced band and the other end of which is connected to said load, and a load line connected at one end to said load and fastened within said slow release device at the other end for release therefrom as said parachute falls to earth so that said load is gradually applied to said second set of shroud lines during said fall and said envelope forms a canopy over said load.

4. A parachute comprising an inflatable oval shaped envelope having an upper and a lower half, means securing the load carried by said parachute to said upper half, the bottom of said lower half having a ring-shaped opening therein through which air for inflating said envelope passes during the descent of said envelope, and a slow release device connected between the bottom portion of said lower half and said load for slowly releasing said lower half toward said upper half during the descent of said envelope until said lower half folds within said upper half to form a canopy over said load.

5. A parachute comprising a single inflatable envelope having a lower half and an upper half, means securing the load carried by said parachute to said upper half, said lower half having a nadir vent through which air for inflating said envelope passes during the descent of said envelope, and means connected between said load and said lower half for slowly releasing said lower half toward said upper half during the descent of said envelope until said lower half folds within said upper half to form a canopy over said load.

JAMES M. BRADY.

References Cited in the file of this patent

UNITED STATES PATENTS

| Number | Name | Date |
|---|---|---|
| 1,183,796 | Bumbaugh | May 16, 1916 |
| 2,308,797 | Nasca | Jan. 19, 1943 |

FOREIGN PATENTS

| Number | Country | Date |
|---|---|---|
| 1,235 | Netherlands | May 1, 1916 |
| 412,099 | Italy | Oct. 17, 1945 |
| 679,872 | France | Jan. 14, 1930 |